United States Patent [19]

Terry

[11] E Re. 30,840

[45] Reissued Jan. 5, 1982

[54] HYDROGEN-HYDRIDE ABSORPTION SYSTEMS AND METHODS FOR REFRIGERATION AND HEAT PUMP CYCLES

[75] Inventor: Lynn E. Terry, Bridgeton, N.J.

[73] Assignee: MPD Technology Corporation, Wyckoff, N.J.

[21] Appl. No.: 45,118

[22] Filed: Jun. 4, 1979

Related U.S. Patent Documents

Reissue of:

[64] Patent No.: 4,055,962
Issued: Nov. 1, 1977
Appl. No.: 715,231
Filed: Aug. 18, 1976

[51] Int. Cl.[3] ..... F25B 15/00; F01K 25/10

[52] U.S. Cl. ..... 62/102; 62/114; 60/644.1

[58] Field of Search ..... 62/2, 102, 114; 60/644, 60/655

[56] References Cited

U.S. PATENT DOCUMENTS

| | | | |
|---|---|---|---|
| 2,182,453 | 12/1939 | Sellew | 62/102 |
| 3,548,606 | 12/1970 | Kuerston | 62/114 |
| 3,943,719 | 3/1976 | Terry et al. | 60/644 |
| 3,957,473 | 5/1976 | Stark et al. | 62/114 |
| 4,044,819 | 8/1977 | Cottingham | 62/2 |

OTHER PUBLICATIONS

Metal Hydride Systems for Solar Energy Storage & Conversion, Gruen et al., Proc. of the Workshop on Solar Energy Storage Subsystems for Heating & Cooling Bldgs., Apr. 16–18, 1975.

A Thermodynamic Analysis of HYCSOS, A Hydrogen Conversion & Storage System, Gruen et al., Mar. 1–3, 1976.

Stability of Ternary Hydrides and Some Applications, Thesis, Van Mal Techn. Hschle of Delft. May 4, 1976, pp. 80–86.

*Primary Examiner*—Lloyd L. King

*Attorney, Agent, or Firm*—Raymond J. Kenny; Francis J. Mulligan, Jr.

[57] ABSTRACT

A hydrogen-hydride absorption system comprising two reactor systems for chemically forming two hydride components, means for supplying heat to, and removing heat from, the component systems, means for partial thermal energy recovery from reactors in each of the systems, and means for conveying hydrogen between component reactor systems.

A method for deriving refrigeration includes the steps of dehydrating the hydride of a first component reactor using a relatively low temperature thermal source and conveying the hydrogen to a second component reactor to be absorbed, and rejecting heat, decreasing the pressure of both component reactors along with partial heat recovery, supplying heat as a refrigeration load to dehydride the second component reactor and conveying the hydrogen to the first component reactor, and pressurizing both reactors through partial heat recovery and further heating.

A method for deriving heat pump effects includes the steps of absorption of hydrogen conveyed from a second component reactor to a first component reactor with the subsequent release of heat at a high temperature, depressurizing both component reactors, dehydriding a first component reactor and conveying the hydrogen to a second component reactor with rejection of heat at a low temperature, and pressurizing the component reactors.

11 Claims, 5 Drawing Figures

HYDROGEN-HYDRIDE ABSORPTION SYSTEMS AND METHODS FOR REFRIGERATION AND HEAT PUMP CYCLES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to hydrogen absorption systems that utilize the heats of absorption as heat sources for heat pump systems and the heats of desorption as heat sinks for refrigeration systems.

2. Brief Description of the Prior Art

In U.S. Pat. No. 3,504,494, a closed cycle method for intermittently producing high energy steam has been described in which the system consists of a power cycle followed by a recharging cycle. In the power cycle, a first hydride bed is heated to desorb hydrogen gas therefrom. The gas flows to a second hydride bed where, the hydrogen can be absorbed at a lower temperature than the temperature of the desorption from the first bed. Absorption of the hydrogen by the second bed releases the heat of absorption which is used to convert water to steam. The steam is used for power production, and the residual heat remaining in the steam after such power production is used for heating the first hydride bed and enhancing the desorption of hydrogen therefrom. After complete desorption of the hydrogen from the first bed and condensation of the residual steam, the recharging cycle is started. In the recharging cycle, the second hydride bed is heated by a heat source which can be a low energy isotope source, a chemical heater, an electrical heater or other suitable source of thermal energy. The second bed is thus caused to dehydride, and the first bed is cooled so that it can absorb the hydrogen desorbed from the second bed preparatory to recommencing the power cycle after recharging.

U.S. Pat. No. 3,943,719 describes hydride-dehydride-hydrogen (HDH) cycles used for the production of simultaneous and continuous power and refrigeration by means of thermochemical compression utilizing hydriding materials. For continuously supplying relatively high pressure hydrogen gas, a plurality of hydride-dehydride reactors are provided and are operated in out-of-phase or staggered sequence so that during the period when low-pressure, relatively cool hydrogen gas is being charged to one of the reactors, another is being activated and another being dehydrided to produce high pressure hydrogen gas. The pressure energy of the gas thus developed in the hydride reactors is used for continuously developing power and refrigeration, following which the hydrogen gas, at reduced energy, is recycled to the reactors to recommence the HDH cycle. In order to chemically compress the hydrogen gas in the form of its hydride, a low-grade thermal source is utilized to supply heat to the several reactors.

In one aspect of the use of the HDH cycle as described in U.S. Pat. No. 3,943,719, the compressed and heated hydrogen gas which is released during the dehydriding phase of the HDH cycle is either passed directly to an expansion device, such as a turbine, or is first precooled via a heat exchanger before expansion. The cold exhaust from the power generating expansion device can be used in a heat exchanger to provide refrigeration prior to recharging the depressurized hydrogen to the HDH reactor bank.

The described methods of utilization of the high-pressure heated hydrogen gas, which is developed as a gaseous product discharged from the reactor bank in the course of carrying out the continuously operated HDH cycle, represent but a few of the uses which can be made of the hydrogen gas in its forms and energy states during the transition occurring between the time of dehydriding from the reactor bank in a pressurized state and the time the reactors are recharged to recommence the hydriding process.

Work carried on by Brookhaven National Laboratory for the United States Government has been proposed for a high efficiency power conversion cycle using hydrogen compressed by absorption to metal hydrides in a regenerative closed hydrogen Brayton cycle. In the cycle, hydrogen is thermochemically compressed using a low-temperature thermal energy source such as geothermal or solar energy, regeneratively heated, and then further heated by a high-temperature thermal source such as fossil or nuclear energy, and then expanded, reheated, and expanded again. The hydrogen is returned through the regenerators and then recompressed in the hydrides. Overall efficiency approaches 30 percent. However, high temperature energy efficiency, defined as the work output divided by the high temperature thermal input, approaches 90 percent.

Further work for the United States Government by the Naval Underwater Systems Center has proposed a heat pump cycle using hydrogen and hydrides. The system is comparable to conventional systems in that a mechanical compressor is used to compress the hydrogen, and absorption upon a base material supplies the heat effect of the heat pump cycle.

The Carnot cycle defines the limit of thermal efficiency not only for heat engine cycles and mechanical refrigeration cycles, but also for absorption cycles. The maximum efficiency for any cycle generating work from any thermal energy input is limited by the Carnot efficiency, which is defined as the net work produced, $W_{net}$, divided by the heat input, $Q_H$, and is equal to $(Q_H-Q_{Amb})/Q_H=W_{net}/Q_H=(T_H-T_{AMB})/T_H$. For mechanical refrigeration, the Carnot limit of thermal efficiency is defined as the heat absorbed by the cooling load, $Q_L$, divided by the net work input, $-W_{net}$, and is equal to $QL/(Q_{Amb}-Q_L)=Q_L/(-W_{net})=T_L/(T_{Amb}-T_L)$. $Q_{Amb}$ is the available ambient heat sink.

An absorption system may be described as a combination heat engine-mechanical refrigeration system. The analogous and equivalent pairs of components between the heat engine and absorption systems are the condenser and absorber, the boiler pump and solution pump, and the boiler and generator. The expansion valve and expansion engine have analogous relations even through the expansion valve does not serve to remove work. The relations that are analogous between the mechanical refrigeration system and the absorption system are the evaporators, condensers, and expansion valves of both systems. The compressor of the mechanical refrigeration system does not have an analogous component in the absorption system since the working fluid gas of the absorption system has been compressed along with the absorbent in the solution pump. The maximum efficiency of an absorption cycle is thus defined with the work output of the expansion device in the heat engine system equal to the work input of the compressor of the mechanical refrigeration system, and is therefore $Q_L/Q_H=(T_L/T_H)\ (T_H-T_{Amb})/(T_{Amb}-T_L)$. The limit of efficiency defined here is for a two-component system. If the system had operated with a three-component system, then the ratio of $Q_L/Q_H$ is on a different per-unit mass basis and the Carnot limit would not be the same as a two-component system. A three-component system might consist of ammonia and two organic or inorganic solvents. In a hydrogen absorption system, the hydrogen would be the primary working fluid, and any of several different classes of reversible hydriding materials could be utilized as the two or more absorbents. Therefore, the ratio $Q_l/Q_H$ of an absorption system utilizing three or more components depends on the Carnot limit of thermal efficiency in a different way in that the limit is mass-dependent.

A heat pump system is essentially a mechanical refrigeration system with a different objective in view. The rejected energy in the refrigeration cycle becomes useful energy. The heat input is to be the evaporator from some ambient heat source. The efficiency is defined as the useful heat rejected. $Q_H$, divided by the net work input, $-W_{net}$, which is equal to $Q_H/-W_{net}=Q_H/Q_H-Q_{Amb})=T_H/(T_H-T_{Amb})$. If an absorption system is again considered as a combination heat pump and heat engine system, with the heat engine operating with a heat source at ambient conditions and a heat sink at some lower temperature $T_L$, the efficiency of the heat engine would be $Q_{Amb}'/W_{net}=Q_{Amb}'/(Q_{Amb}'-Q_L)=T_{Amb}/(T_{Amb}-T_L)$. The combined absorption system efficiency can be defined again with the work output of the heat engine system equal to the work input to the heat pump system as $Q_H/Q_{Amb}'=T_H/T_{Amb})(T_{Amb}-T_L)/(T_H-T_{Amb})$ where the $Q_{Amb}'$ is only the heat input to the heat engine system. This defined efficiency of the absorption system is also massdependent for a system of three or more components.

A factor that is coming into more use recently is the concept of the energy utilization factor. This factor is defined as the desired energy transfer divided by the fuel input from the basic energy resource. Thus, typically, a natural gas furnace would have an E.U.F. of approximately 0.69, as 31 percent of the heat content of the natural gas is lost up the stack. For a heat pump, the E.U.F. is typically about 0.77, with the basic energy resource being the fossil fuel or nuclear fuel to an electric generating plant. The E.U.F. could be much higher for the heat pump if more of the energy, such as the rejected heat of the electric generating plant, were used. For example, if an electric generating plant received 1 Joule of thermal energy as a heat input and rejected 0.7 Joule, 0.3 Joule or energy would be produced as electrical energy. This 0.3 Joule of electricity used with a heat pump of 2.0 efficiency would produce 0.6 Joule of useful heat at the point of use. If the rejected heat of the electric generating plant could also be used, the E.U.F. would become 1.30. An absorption system using the combined systems of a heat engine and mechanical refrigeration analogy, and operating with a heat source of 1 Joule as a high-temperature input to the generator, could reject 2 Joules as a useful energy transfer such as heating a home, with one of the Joules coming from the heat engine condenser and the other Joule coming from the refrigerator condenser. The available refrigeration would also be 1 Joule, and the E.U.F. for such a system would be 3.0. This high efficiency is only possible if the efficiency is mass-dependent, as with a three-component system. Thus, effective utilization of the rejected heat of an absorption system of three or more components can mean a relatively high energy utilization factor.

BRIEF DESCRIPTION OF THE PRESENT INVENTION

New absorption refrigeration and heat pump systems and methods for effectively conserving our energy resources are presented by this invention. Refrigeration and heating are continuously and efficiently generated directly from the heats of desorption and absorption, respectively, of three or more component hydrogen absorption systems. Hydrogen-hydride absorption systems have the advantage over other conventional absorption systems in that the hydrogen remains a gas at one atmosphere pressure down to 20° K. and can operate over a range of temperatures up to the melting point of many metals. Hydrogen absorption systems require no mechanical energy input, and operation is totally thermochemical, with the driving potential caused by relative pressure differences. The thermally induced driving potential therefore requires at least two different temperature levels.

Broadly described, the refrigeration and heat pump systems of this invention comprise a plurality of hydride reactors consisting of at least two component hydridable materials, means for conveying hydrogen gas between component reactor systems, means for supplying heat to each component reactor system in out-of-phase, staggered cycles to each reactor of the component systems, and means for removing heat from the reactors of the component systems.

The invention includes a sequential method that ideally includes the steps of reversibly combining hydrogen with a hydride-forming material for one of the two or more component hydride systems, heating the hydride at constant volume to effectively chemically compress the hydrogen gas, reversibly dehydriding the hydride-forming materials, and cooling the substantially dehydrided material under constant volume to effect chemical decompression so as to effectively recondition the hydride-forming material, and then cyclically repeating these steps. At the same time as the above steps are proceeding, at least one of the two or more component hydride systems is operating with the above steps in reverse order. The preferred practice of the method of the invention entails carrying out the described steps in staggered or out-of-phase relationship for each of the component hydride-forming materials, using a plurality of discrete reactor beds to develop a substantially continuous refrigeration sink or heat source.

In certain embodiments of the invention, the refrigeration system may act as a heat sink so that systems in series may be operated to supply a refrigeration sink of substantially lower temperature.

In another embodiment of the invention, the heat pump system may act as a heat source so that systems in series may be operated to supply a heat source of substantially higher temperature.

An important object of the invention is to provide a novel means for producing a more efficient refrigeration and heat pump means than the conventional two-component systems.

Another important object of the invention is to provide a totally thermochemical means of producing refrigeration sinks and heat sources.

Another object is to provide a simple and efficient means of separation of the absorber and the absorbent.

Additional objects and advantages of the invention will become apparent as the following detailed description of certain embodiments of the invention, and detailed examples thereof, are read in conjunction with the accompanying drawings which illustrate certain preferred applications of the invention.

DETAILED DESCRIPTION OF PREFERRED EMBODIMENTS OF THE INVENTION

Figure 1:
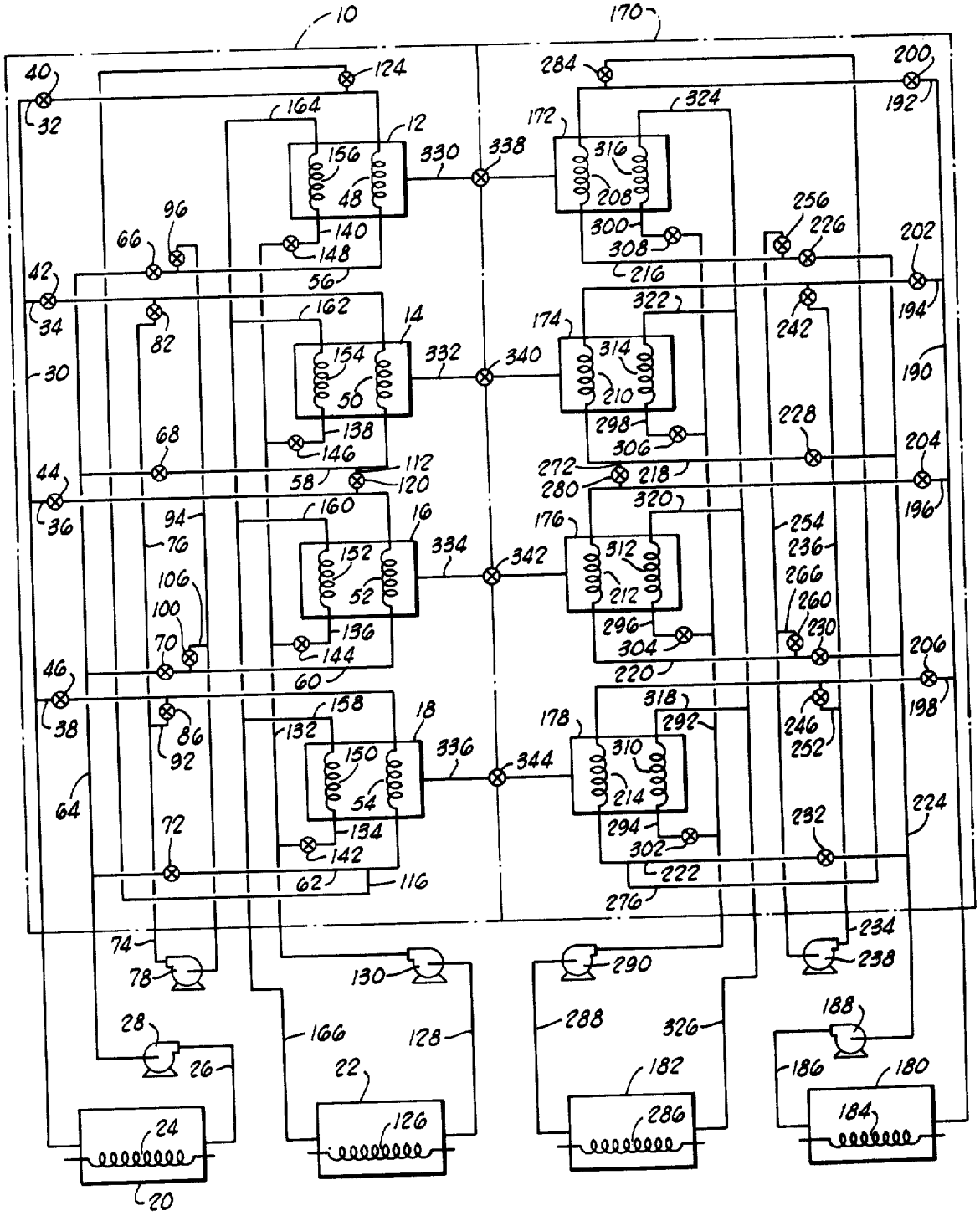
FIG. 1 is a schematic flow diagram illustrating the hydrogen-hydride absorption component systems and heat exchangers.

Referring initially to FIG. 1 of the drawings, two identical hydride reactor systems 10 and 170, each containing a different hydriding material, are illustrated, with hydride reactors 12, 14, 16, and 18 in system 10, and hydride reactors 172, 174, 176, and 178 in system 170. There are two different modes of operation, with one mode supplying refrigeration as its primary function, and the other mode supplying a heat source through a heat pump action. Each mode of operation is controlled through heat exchangers 20 and 22 of system 10, and heat exchangers 180 and 182 of system 170. Heat exchangers 20 and 22 of component system 10 and heat exchangers 180 and 182 of component system 170 may serve to supply heat to, or remove heat from, each of their respective component systems, depending on the mode of operation.

For purposes of illustration, the mode of operation will be the refrigeration mode, with component system 10 acting as the heat engine system and system 170 acting as the refrigeration system. A relatively high-temperature heat exchange fluid is supplied through heat exchange coil 24 and supplies heat to the heat exchange fluid contained in loop 26. The heat exchange fluid is charged to heat exchanger 20 through feed pump 28. The heat exchange fluid from heat exchanger 20 is charged to system 10 through manifold 30 and is admitted, in a sequence hereinafter described, to the reactors 12–18 through branch conduits 32, 34, 36, and 38 via valves 40, 42, 44, and 46, respectively. The branch conduits 32–38 are respectively connected to heat exchange coils 48, 50, 52, and 54 located in the reactors 12–18. The heat exchange coils 48–54 are also connected through branch return conduits 56, 58, 60, and 62, respectively, to a return manifold conduit 64 through valves 66, 68, 70, and 72.

A heat recovery loop 74 supplies a heat exchange fluid to manifold 76 from heat recovery pump 78 to the reactors 14 and 18 through branch conduits 34 and 38 via valves 82 and 86. It will be noted that valve 86 is located in the short conduit section 92 which connects the manifold 76 to the branch conduit 38. A return manifold 94 is connected to branch return conduits 56 and 60 via valves 96 and 100, respectively. It will also be noted that valve 100 is located in the short conduit 106 which connects the manifold 94 to branch return conduit 60. Sensible heat recovery conduits 112 and 116 are provided in the heat recovery loop 74, with conduit 112 extending between the branch conduit 58 and the branch conduit 36 and containing valve 120. Conduit 116 interconnects the branch conduit 62 and branch conduit 32 and contains valve 124.

An ambient temperature heat exchange fluid is supplied through heat exchange coil 126 and removes heat from the heat exchange fluid contained in loop 128. The heat exchange fluid from heat exchanger 22 is charged through feed pump 130 to system 10 through manifold 132 and is admitted, in a sequence hereinafter described, to the reactors 12–18 through branch conduits 134, 136, 138, and 140, respectively, containing valves 142, 144, 146, and 148. The branch conduits 134–140 are respectively connected to heat exchange coils 150, 152, 154, and 156 located in reactors 12–18 and respectively connected by branch return conduits 158, 160, 162, and 164 to return manifold 166.

Hydride component reactor system 170 consists of a system equivalent to hydride component reactor system 10. System 170 is the refrigeration equivalent of a mechanical refrigeration system, and as such, heat exchanger 180 serves as the refrigeration means to heat exchange coil 184, and serves to supply heat to the heat exchange fluid contained in loop 186. The heat exchange fluid is charged to heat exchanger 180 through feed pump 188. The heat exchange fluid from heat exchanger 180 is charged to system 170 through manifold 190 and is admitted, in a sequence hereinafter described, to the reactors 172–178 through branch conduits 192, 194, 196, and 198 via valves 200, 202, 204, and 206, respectively. The branch conduits 192–198 are respectively connected to heat exchange loops 208, 210, 212, and 214 located in reactors 172–178. The heat exchange coils 208–214 are also connected through branch return conduits 216, 218, 220, and 222, respectively, to a return manifold conduit 224 through valves 226, 228, 230, and 232.

A heat recovery loop 234 supplies a heat exchange fluid to a manifold 236 from heat recovery pump 238 to the reactors 174 and 178 through branch conduits 194 and 198 via valves 242 and 246. It will be noted that valve 246 is located in the short conduit section 252 which connects the manifold 236 to the branch conduit 198. A return manifold 254 is connected to branch return conduits 216 and 220 via valves 256 and 260, respectively. Valve 260 is located in the short conduit 266. Sensible heat recovery conduits 272 and 276 are provided in the recovery loop 234, with conduit 272 extending between the branch conduit 218 and the branch conduit 196 and containing valve 230. Conduit 276 interconnects the branch conduit 222 and branch conduit 192 and contains valve 284.

An ambient temperature heat exchange fluid is supplied through heat exchange coil 286 and removes heat from the heat exchange fluid contained in loop 288. The heat exchange fluid from heat exchanger 182 is charged from feed pump 290 to system 170 through manifold 292 and is admitted, in a sequence herein-after described, to the reactors 172–178 through the branch conduits 294, 296, 298, and 300, respectively, through valves 302, 304, 306, and 308. The branch conduits 294–300 are respectively connected to heat exchange loops 310, 312, 314, and 316 located in the reactors 172–178. The heat exchange coils 310–316 are also connected through branch return conduits 318, 320, 322, and 324, respectively, to a return manifold conduit 326.

In the refrigeration mode of operation, a relatively hot heat exchange fluid is supplied to heat exchanger 20 through coil 24 to heat the fluid in loop 26, which supplies the heat of desorption sequentially to one of the reactors 12–18 through coils 48–54, respectively, of system 10. The heat recovery loop 74 serves to recover a substantial part of the sensible heat contained in the reactors 12–18 after complete desorption. The heat of absorption produced upon hydriding one of the reactors 12–18 is removed from system 10 via loop 128 through heat exchanger 22 via coil 126 by a heat exchange fluid at some temperature level between that of the heat supplied in loop 26 and the refrigeration load of system 170. The refrigeration load is supplied to heat exchanger 180 of system 170 via coil 184. The heat is conveyed sequentially to one of the reactors 172–178 through coils 208–214, respectively, to supply the heat of desorption. The heat recovery loop 234 serves to recover a substantial part of the sensible cooling effect contained in the reactors 172–178 after complete desorption. The heat of absorption is removed via heat exchanger 182 by means of coil 286 and an external heat exchange fluid at some temperature level between that of the heat supplied in loop 26 and the refrigeration load of system 170.

In the heat pump mode of operation, the heat of absorption produced upon sequentially hydriding one of the reactors 172–178 of system 170 is removed via heat exchanger 180 by means of coil 184 to some heat exchange fluid at some relatively low temperature. Heat recovery loop 234 serves to recover a substantial part of the sensible heat contained in the reactors 172–178 through coils 208–214, respectively, after complete desorption. The heat of desorption is supplied sequentially to each of the reactors 172–178 through coils 310–316 and loop 288 via heat exchanger 182. A heat exchange fluid at a temperature level between that of the heat pump load and the rejection temperature of coil 184 supplies the heat of desorption via coil 286. The heat output of the heat pump is supplied by the heat of absorption of reactors 12–18 of system 10. This heat is supplied to an external heat exchange fluid from heat exchanger 20 via coil 24. The heat of absorption of the reactors 12–18 is removed via coils 48–54, respectively, which supply loop 26. The heat recovery loop 74 serves to recover a substantial part of the sensible heats of reactors 12–18 after absorption. The heat of desorption is sequentially supplied to reactors 12–18 via loop 128 and coils 150–156. Heat from an external heat exchange fluid at a temperature between that of the heat source of the heat pump and the rejection temperature of the heat engine system 170 supplied to loop 128 via coil 126 and heat exchanger 22.

Hydrogen is conveyed between the reactors of systems 10 and 170 via conduits 330, 332, 334, and 336 which contain, respectively, valves 338, 340, 342, and 344. Both systems are operated in such a manner in order that the reactor of system 10 is in a phase compatible with the opposing reactor of system 170. One manner of operation is for the first step in a cycle for reactors 12–18 of system 10 to operate in the following manner, with reactor 12 in a hydriding phase, reactor 14 activating, reactor 16 deactivating, and reactor 18 in a dehydriding phase. In system 170, the corresponding phases of the opposing reactors necessitate that reactor 172 be in a dehydriding phase to supply hydrogen via conduit 330 to reactor 12, that reactor 174 be activating preparatory to hydriding reactor 14 in the second sequential step of a complete cycle, that reactor 176 be deactivating, and that reactor 178 be hydriding by means of hydrogen supplied via conduit 336 from reactor 18, which is dehydriding. Table I more lucidly describes each step in a cycle for each reactor.

TABLE I

| Reactor | Phase I | Phase II | Phase III | Phase IV |
|---|---|---|---|---|
| 12 | Hydriding | Activating | Dehydriding | Deactivating |
| 14 | Activating | Dehydriding | Deactivating | Hydriding |
| 16 | Deactivating | Hydriding | Activating | Dehydriding |
| 18 | Dehydriding | Deactivating | Hydriding | Activating |
| 172 | Dehydriding | Activating | Hydriding | Deactivating |
| 174 | Activating | Hydriding | Deactivating | Dehydriding |
| 176 | Deactivating | Dehydriding | Activating | Hydriding |
| 178 | Hydriding | Deactivating | Dehydriding | Activating |

Each of the reactors 12–18 and 172–178 is a closed vessel, and in the preferred embodiment of the invention, such a vessel consists of two concentric tubes, with the inner tube conveying one heat exchange fluid, the space between the concentric tubes containing the hydride material, and the second heat exchange fluid being conveyed over the outer tube surface. Such an arrangement allows for the operation of the refrigeration and heat pump systems over a broad range of temperatures whereas one or two heat transfer fluids might not have satisfactory physical properties over the broad temperature range. Up to four different and independent heat exchange fluids can be supplied to the total systems of 10 and 170.

Preferably, the hydride material in the reactors is a solid powdered material capable of reacting with hydrogen in a reversible hydriding reaction. The solid materials offer a distinct advantage over conventional absorption systems in that the working fluid, hydrogen, is easily separated from the absorbent, the hydride material, without distillation or other separation processes. It is necessary that the hydride materials of systems 10 and 170 be different. In actuality, five components are necessary for the operation of the system, the five components being hydrogen, the base material of system 10, the hydride of the base material of system 10, a second base material of system 170, and its hydride.

Previous mention of a three-component system referred to the two different hydride components and the working fluid, hydrogen. Solid materials which are suited for use in the reactors include, but are not limited to, nickel-magnesium alloys, iron-titanium alloys, copper-magnesium alloys, vanadium metal, and vanadium-silicon alloys, lanthanum-nickel alloys, lanthanum-cobalt alloys, scandium metal, scandium-cobalt alloys, and alloys of the generic formula $RT_5$, where R is a lanthanide ion, and T is a 3d-transition metal ion.

With respect to the characteristic response of hydridable materials to exposure to hydrogen gas under varying conditions of temperature and pressure, the relationship of the equilibrium pressure to the equilibrium temperature over the phase transition from base material to hydrided base material, and the reverse reaction, is expressed by the empirical equation $$\ln P_{eq} = -(A/T_{eq}) + B$$

where $P_{eq}$ is the equilibrium pressure of hydrogen in atmospheres, $T_{eq}$ is the corresponding equilibrium temperature in degrees Kelvin, A is a constant with dimensions of temperature, and B is a constant without dimensions. On the basis of the specified equation, which is characteristic of materials which undergo hydriding to an equilibrium state upon exposure to hydrogen gas, the preferred hydridable materials for use in the present invention can be determined. Such materials are those which will supply the necessary pressure differences between the reactors of systems 10 and 170 over the desired operation temperatures of the refrigeration and heat pump modes of operation. The empirical equation is usually a best fit for the equilibrium data of absorption. There often tends to be hysteresis upon absorption and desorption. Hysteresis is demonstrated in that, for the same equilibrium temperature, the equilibrium pressure for absorption is sometimes higher than that for desorption. An inefficiency is also demonstrated in that upon hydriding, the equilibrium pressure may increase for the same equilibrium temperature as the equilibrium hydride phase is approached. The reverse is also true in that, upon dehydriding, the equilibrium pressure may decrease at the same equilibrium temperature of absorption as the equilibrium base material phase is approached. To advantage, a three-component system of hydrogen, base material, and hydrided material has essentially a constant heat of absorption or desorption over a wide range of temperatures. Therefore, approaches to ideality would be greater than with conventional systems, whose heats of absorption usually decrease with temperature. In the specified equation, the constant A is related to the heat of absorption by being equal to the heat of formation divided by the universal gas constant. With a phase diagram or a chemical equation describing the phase reaction and the empirical equation, the refrigeration or heat pump system of the present invention can be readily designed.

To explain the overall operation of a cycle, the refrigeration mode of operation of the systems illustrated in FIG. 1 will be described. In the operation of the refrigeration cycle, the reactors 12–18 and 172–178 are operated in staggered sequence during a cycle, with each reactor undergoing a hydriding, heat recovery/activating, heat recovery/deactivating, and dehydriding phase during each cycle of operation. In order to further explain the overall operation of the systems, the operation of reactors 12 and 172 will intially be described before discussing the alternating sequence in which the other three reactors are operated. For purposes of demonstration, a $LaNi_4Cu$ alloy will be considered to be contained in reactor 12, and an FeTi alloy in reactor 172. At the outset, the reactor 12 in system 10 will be considered to be in a deactivated, dehydrated state—i.e., a hydride of the alloy $LaNi_4Cu$ has not been formed, and the temperature in this reactor has been reduced to a temperature somewhere between the dehydriding temperature of system 10 and the dehydriding temperature of system 170, with such temperature chosen for this example to 311° K. (100° F.). The reactor 172 of system 170 will be considered to be in an activated, hydrided state—i.e., a hydride of the alloy FeTi has been formed, and the temperature in reactor 172 has been lowered to a temperature lower than that of the refrigeration load, with such temperature chosen for demonstration to be 260° K. (7.5° F.).

At this time, a heat exchange fluid, preferably cold water at a temperature somewhat below 311° K., is passed through coil 126, which gains heat from the heat exchange fluid in loop 128, which fluid carries the heat of absorption of reactor 12. The fluid in loop 128 could also be water. The heat exchange fluid is allowed to pass into reactor 12 and through coil 156 from pump 130 via manifold 132 by opening valve 148. The valves 40, 66, 96, and 124 are closed at this time. At the commencement of the hydriding phase, valve 338 in the conduit 330 is opened to permit hydrogen gas to flow to reactor 12 from reactor 172, which is dehydriding in a manner to be described next. The hydrogen from reactor 172 is charged at a typical pressure of 0.9 atmospheres and a temperature of 260° K. to reactor 12. As the hydrogen enters reactor 12 under these conditions of temperature and pressure, it combines chemically with the $LaNi_4Cu$ alloy therein in an exothermic reaction. The exothermic chemical reaction which occurs evolves sufficient heat that the temperature is controlled, preferably, through the use of the cold water circulated through the heat exchange coil 156 in the reactor. The temperature and circulation rate of the water are regulated to prevent the temperature of the hydride in the reactor from exceeding the equilibrium temperature of 311° K. Line AB of the temperature-entropy diagram of $LaNi_4Cu$ of FIG. 2 of the drawings represents the hydriding reaction of the base material. The exothermic reaction produces a heat of 23837 Joules/gm $H_2$.

At the same time as reactor 12 is hydriding, reactor 172 is dehydriding at a substantially lower temperature by heat supplied as the refrigeration load. Heat is transferred as the refrigeration load via coil 184 in heat exchanger 180 to the heat exchange fluid in loop 186. The heat exchange fluid can be a chlorinated hydrocarbon which remains in the liquid phase over the operating temperature range for which the refrigeration system is designed, and also for off design operation. The fluid is charged to reactor 172 through coil 208 via manifold 190 by opening valves 200 and 226. The valves 256, 284, and 308 are closed at this time. As heat is supplied to reactor 172, hydrogen leaves the reactor at a temperature of 260° K. and 0.9 atmospheres pressure, and is conveyed to reactor 12 via conduit 330 containing the open valve 338. The reverse of the chemical reaction that formed the hydride is in process to reform the base material FeTi. The reaction is endothermic and is preferably controlled through the use of circulating heated chlorinated hydrocarbon liquid in heat exchange coil 208 in the reactor. The temperature and circulation rate of the chlorinated hydrocarbon liquid are regulated so as to maintain the dehydriding reaction and a pressure of at least 0.9 atmospheres or higher. Line AB of the temperature-entropy diagram of FeTi of FIG. 3 of the drawings represents the dehydriding reaction of the hydrided material. The endothermic reaction requires a heat of 15690 Joules/gm $H_2$.

When the FeTi alloy in reactor 172 has been completely dehydrided, the valving in reactor 172 is changed so that up to 50 percent of the sensible cooling effect of reactor 172 may be recovered to cool down reactor 178. By recovering the sensible cooling effect, the invention is able to more closely approach the ideal efficiency. The heat exchange fluid must be the same as in loop 186 since the same heat exchange coil 208 of reactor 172 is used. Heat removed from reactor 178 and conveyed to the heat exchange fluid in coil 214 is supplied to reactor 172 via branch conduit 276 and open valve 284. After passing through coil 208, the heat exchange fluid returns to pump 238 through branch return conduit 216 and the open valve 256. Pump 238 charges the heat exchange fluid to reactor 178 via short conduit 252 containing the open valve 246 and interconnecting branch conduit 198 and manifold 236. Valves 200, 226, 308, and 338 of reactor 172 are closed at this time. Since reactor 172 cannot be completely activated by the sensible heat contained in reactor 178, reactor 172 may be completely activated by the further heating action of hydriding, which is its next step in the cycle. The heat recovery/activation step is shown as line BC of FIG. 3 of the drawings.

Simultaneously, the $LaNi_4Cu$ alloy in reactor 12 is partially activated by heat recovery loop 74. Valve 124 in branch conduit 116 is opened to allow heat recovered from reactor 18 to be transferred via coil 48 to reactor 12. The fluid then returns to pump 78 via branch conduit 56 to manifold 94 through open valve 96. The fluid is returned to coil 54 in reactor 18 via manifold 76 through the open valve 86 in the short conduit 92 and via branch conduit 38. Valves 40, 66, 148, and 338 are closed. Up to 50 percent of the sensible heat contained in reactor 18 is removed by the heat exchange fluid. Complete activation of reactor 12 is accomplished by transferring heat from loop 26. This heat recovery/activation step is line BC of FIG. 2 of the drawings. Partial heat recovery in step BC is gained from a reactor, such as reactor 18, which is proceeding with step EF. The next step in the cycle of reactor 12 is dehydriding, by means of heat supplied in loop 26. Since activation has not been completed, valve 338 remains closed while heat is supplied by loop 26 so that activation may be completed. A heat exchange fluid at a temperature sowewhat higher than 351° K. (171° F.) is passed through coil 24, with heat being transferred to the fluid in loop 26. This heat exchange fluid is preferably water. By action of pump 28, the heated water is charged to reactor 12 containing coil 48 via manifold 30 through branch conduit 32 containing the opened valve 40. The heated water transfers heat through coil 48 to the $LaNi_4Cu$ alloy in reactor 12, first completing activation with valve 338 contained in conduit 330 closed. Upon completion of activation, valve 338 is opened with the heated water supplying the heat of desorption to dehydride the $LaNi_4Cu$ alloy, with said heat of desorption being substantially 23837 Joules/gm $H_2$. The completion of the activation step is illustrated as line CD on FIG. 2, and the dehydriding step is shown as line DE. The water is returned to pump 28 and, subsequently, to heat exchanger 20 via branch conduit 56 containing the open valve 66, and then through manifold 64. Valves 96, 124, and 148 are closed during this phase of the cycle.

Concurrently, reactor 172 is completing the activation phase and begins the hydriding phase of the cycle as it is being charged by the hydrogen that is desorbed by reactor 12. Completion of the activation phase can be considered part of the hydriding step, as the reactor can be heated and pressurized by the actual process of the hydriding step. The completion of the activation phase is achieved by opening valve 338 and charging hydrogen to reactor 172. The heat of absorption causes the reactor to heat up, and the equilibrium temperature of 311° K. and equilibrium pressure of 6 atmospheres is rapidly attained. A heat exchange fluid, preferably water, at a temperature somewhat below 311° K., is supplied to heat exchanger 182 via coil 286, where the heat of absorption is removed from the fluid in loop 288 so as to maintain the temperature in reactor 172 at substantially 311° K. The fluid in loop 288 is charged to reactor 172 by pump 290 through manifold 292 and branch conduit 300 containing open valve 308. Heat is transferred from reactor 172 through coil 316 to the fluid in loop 288, and the fluid is returned to heat exchanger 182 via branch conduit 324 and manifold 326. Valves 200, 226, 256, and 284 are closed at this time.

Figure 3:
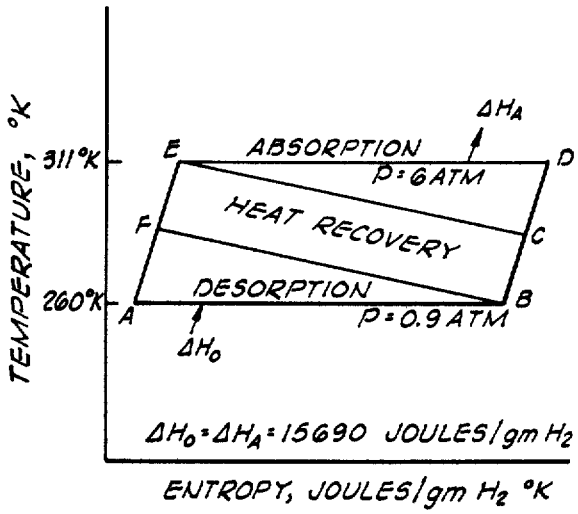
FIG. 3 is a temperature-entropy diagram for the base material FeTi used in the second component system illustrated in FIG. 1 of the refrigeration mode of operation and used as the refrigeration cycle.

The final step in the cycle for reactor 172 is heat recovery/deactivation. As mentioned previously, part of the sensible heat contained in reactor 172 is transferred to reactor 178 to partially activate it. The fluid in loop 234 serves to remove sensible heat from reactor 172 via coil 208 and to partially activate reactor 178 via coil 214. Valving and fluid flow are the same as in the heat recovery/activation phase for reactor 172. Line EF of FIG. 3 illustrates the heat recovery/deactivation step. Complete deactivation of reactor 172 is achieved by the action of dehydriding, in which the valving is the same as the first step of a new cycle.

Figure 2:
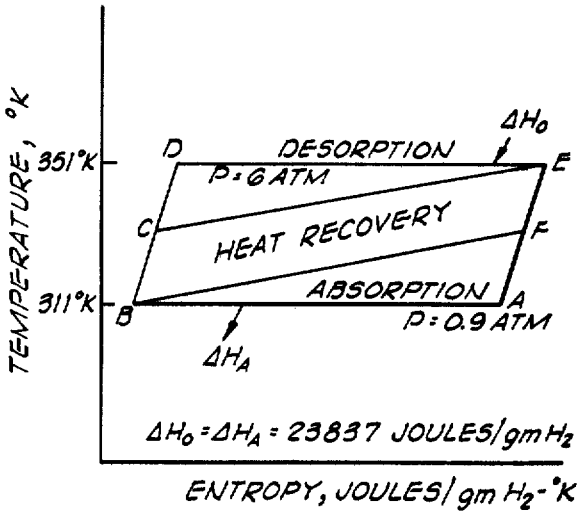
FIG. 2 is a temperature-entropy diagram for the base material $LaNi_4Cu$ used in one of the component systems illustrated in FIG. 1 and operating in the refrigeration mode as the heat engine cycle.

Reactor 12 is in the heat recovery/deactivation phase. Part of the sensible heat of reactor 12 is removed by heat recovery loop 74 and transferred to reactor 18. The valving and fluid flow are the same as the heat recovery/activation phase for reactor 12. Line EF of FIG. 2 illustrates the heat recovery/deactivation phase. Complete deactivation of reactor 12 is achieved by valving as in the hydriding step of the next cycle.

The described four steps of reactor 12 and the four steps of reactor 172 in a complete cycle of the refrigeration mode of operation are also characteristic of the sequential steps for the remaining reactors in systems 10 and 172. By properly synchronizing the operation of the eight reactors, a continuous refrigeration heat sink is available from heat exchanger 180. The sequential steps for each reactor in one complete cycle has previously been cited in Table I. In order to more fully explain and clarify the synchronization and sequential operation of the valves during the refrigeration mode of operation, Table II is provided to show the status of the various valves used in controlling the flows of the heat exchange fluids and the flow of hydrogen between reactor systems.

TABLE II

| | Reactor 12 | Reactor 14 | Reactor 16 | Reactor 18 |
|---|---|---|---|---|
| Dehydriding Phase | | | | |
| Valves Opened | 40, 66, 338 | 42, 68, 340 | 44, 70, 342 | 46, 72, 344 |
| Valves Closed | 96, 124, 148 | 82, 146 | 100, 120, 144 | 86, 142 |
| Activating Phase | | | | |
| Valves Opened | 96, 124 | 82 | 100, 120 | 86 |
| Valves Closed | 40, 66, 148, 338 | 42, 68, 146, 340 | 44, 70, 144, 342 | 46, 72, 142, 344 |
| Deactivating Phase | | | | |
| Valves Opened | 96, 124 | 82 | 100, 120 | 86 |

TABLE II-continued

| | | | | |
|---|---|---|---|---|
| Valves Closed | 40, 66, 148, 338 | 42, 68, 146, 340 | 44, 70, 144, 342 | 46, 72, 142, 344 |
| Hydriding Phase | | | | |
| Valves Opened | 148, 338 | 146, 340 | 144, 342 | 142, 344 |
| Valves Closed | 40, 66, 96, 124 | 42, 68, 82 | 44, 70, 100, 120 | 46, 72, 86 |
| | Reactor 172 | Reactor 174 | Reactor 176 | Reactor 178 |
| Dehydriding Phase | | | | |
| Valves Opened | 200, 226, 338 | 202, 228, 340 | 204, 230, 342 | 206, 232, 344 |
| Valves Closed | 256, 284, 308 | 242, 306 | 260, 280, 304 | 246, 302 |
| Activating Phase | | | | |
| Valves Opened | 256, 284 | 242 | 260, 280 | 246 |
| Valves Closed | 200, 226, 308, 338 | 202, 228, 306, 340 | 204, 230, 304, 342 | 206, 232, 302, 344 |
| Deactivating Phase | | | | |
| Valves Opened | 256, 284 | 242 | 260, 280 | 246 |
| Valves Closed | 200, 226, 308, 338 | 202, 228, 306, 340 | 204, 230, 304, 342 | 206, 232, 302, 344 |
| Hydriding Phase | | | | |
| Valves Opened | 308, 338 | 306, 340 | 304, 342 | 302, 344 |
| Valves Closed | 200, 226, 256, 284 | 202, 228, 242 | 204, 230, 260, 280 | 206, 232, 246 |

From the foregoing description of the method of operation of the refrigeration cycle of the present invention, it will be perceived that the system of this invention provides a highly efficient method of continuously providing a refrigeration heat sink. Typically, the design of the system described with 50 percent heat recovery allows for an energy utilization factor of 1.98 where, if the invention is used in a home, the rejected heat of 37885 Joules/gm $H_2$ can be used to heat the home and hot water, and refrigeration of 12496 Joules/gm $H_2$ is available for both the referigerator and freezer. Heat of 25390 Joules/gm $H_2$ must be provided as the heat source. The Carnot efficiency for an absorption refrigeration cycle operating at the described temperatures is 0.58. The efficiency of the invention operating as described is 0.49. If it were physically possible to have 100 percent energy recovery, the efficiency of the invention would be 0.66. This demonstrates that the efficiency of this invention is mass-dependent, since it exceeds the efficiency of that possible with a two-component absorption system. It would be possible with other component systems to exceed the two-component efficiency even with only 50 percent energy recovery.

Figure 4:
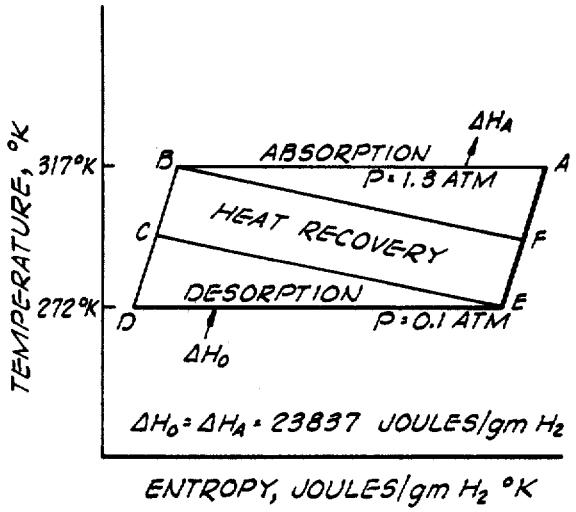
FIG. 4 is a temperature-entropy diagram for the base material $LaNi_4Cu$ of one of the component systems operating in a heat pump mode and used as the heat pump cycle.

Operation of the invention in the heat pump mode requires the same reactor steps as in Table I and only a switching of the hydriding and dehydriding valve sequence in Table II. Table III shows these changes. The difference in operation is the effect achieved by the heat exchangers 20, 22, 180, and 182. For purposes of illustrating the operation of the invention, system 10 contains $LaNi_4Cu$ alloy in reactors 12–18. Coil 24 of heat exchanger 20 serves to remove the heat of absorption from any of the reactors 12–18 that are in the phase of hydriding. The heat removed is that available as the heat pump effect of this invention. Line AB of FIG. 4 of the drawings shows the hydriding phase of the $LaNi_4Cu$ alloy. Heat is rejected in the heat pump cycle at a temperature of 317° K. (111° F.). Substantially 50 percent of the sensible heat is recovered by loop 74 and is conveyed to one of the reactors of system 10 in the activation phase. Line BC of FIG. 4 represents the heat recovery phase. Line CD illustrates the completion of deactivation, which is accomplished at the beginning of the dehydride phase. Dehydriding can, for this example, be considered to be actuated by removal of the heat of fusion of water through heat exchanger 22 to form ice. The dehydriding phase occurs at 272° K. (30° F.) and is represented by line DF of FIG. 4. Line EF is the representation of the activation of the reactors by the recovered heat in loop 74. Completed activation of a reactor is actuated by the absorption phase of the cycle, and is shown by line FA of FIG. 4.

TABLE III

| | Reactor 12 | Reactor 14 | Reactor 16 | Reactor 18 |
|---|---|---|---|---|
| Dehydriding Phase | | | | |
| Valves Opened | 148, 338 | 146, 340 | 144, 342 | 142, 344 |
| Valves Closed | 40, 66, 96, 124 | 42, 68, 82 | 44, 70, 100, 120 | 46, 72, 86 |
| Activating Phase | | | | |
| Valves Opened | 96, 124 | 82 | 100, 120 | 86 |
| Valves Closed | 40, 66, 148, 338 | 42, 68, 146, 340 | 44, 70, 144, 342 | 46, 72, 142, 344 |
| Deactivating Phase | | | | |
| Valves Opened | 96, 124 | 82 | 100, 120 | 86 |
| Valves Closed | 40, 66, 148, 338 | 42, 68, 146, 340 | 44, 70, 144, 342 | 46, 72, 142, 344 |
| Hydriding Phase | | | | |
| Valves Opened | 40, 66, 338 | 42, 68, 340 | 44, 70, 342 | 46, 72, 344 |
| Valves Closed | 96, 124, 148 | 82, 146 | 100, 120, 144 | 86, 142 |
| | Reactor 172 | Reactor 174 | Reactor 176 | Reactor 178 |
| Dehydriding Phase | | | | |
| Valves Opened | 308, 338 | 306, 340 | 304, 342 | 302, 344 |
| Valves Closed | 200, 226, 256, 284 | 202, 228, 242 | 204, 230, 260, 280 | 206, 232, 246 |
| Activating Phase | | | | |
| Valves Opened | 256, 284 | 242 | 260, 280 | 246 |
| Valves Closed | 200, 226, 308, 338 | 202, 228, 306, 340 | 204, 230, 304, 342 | 206, 232, 302, 344 |
| Deactivating Phase | | | | |
| Valves Opened | 256, 284 | 242 | 260, 280 | 246 |
| Valves Closed | 200, 226, 308, 338 | 203, 228, 306, 340 | 204, 230, 304, 342 | 206, 232, 302, 344 |

TABLE III-continued

| Hydriding Phase | | | | |
|---|---|---|---|---|
| Valves Opened | 200, 226, 338 | 202, 228, 340 | 204, 230, 342 | 206, 232, 344 |
| Valves Closed | 256, 284, 308 | 242, 306 | 260, 280, 304 | 246, 302 |

Figure 5:
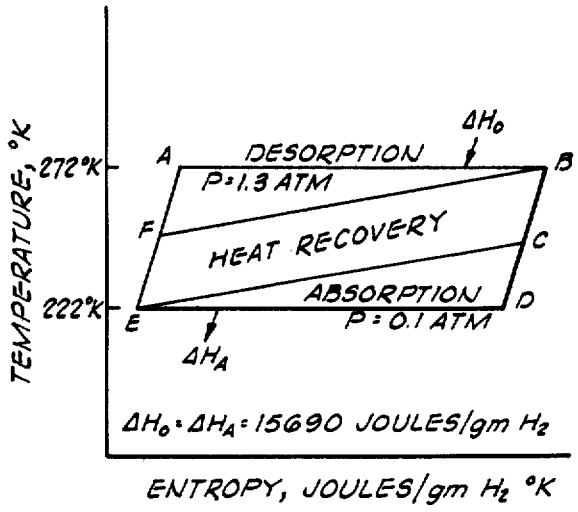
FIG. 5 is a temperature-entropy diagram for the base material FeTi of the second component system operating in a heat pump mode as the heat engine cycle.

Simultaneously, reactor 172 is operating as the heat engine cycle. Line AB of FIG. 5 represents the desorption of reactor 172. Heat is supplied by the freezing of water. The desorbed hydrogen is conveyed to reactor 12, which is absorbing hydrogen at substantially 1.3 atmospheres. Line BC is again representing partial energy recovery, and complete deactivation is shown by line CD. Heat is rejected from heat exchanger 180 through coil 184 as reactor 172 absorbs hydrogen released by reactor 12 at substantially 0.1 atmospheres as depicted by line DE. The rejection temperature is assumed to 222° K. (−60° F.). This energy could be rejected to the environment of such places as the Arctic or Antarctic, where the air temperature often gets below 222° K. Loop 234 of system 170 partially recovers thermal energy, which partially activates reactor 172 as depicted by line EF. Complete activation, shown as line FA, is accomplished by heat removed from the water and supplied to reactor 172 via loop 326.

The E.U.F. of this heat pump design is 0.52. A conventional electrical heat pump system has a typical E.U.F. for home design of 0.77. The main reason for the large difference between a conventional system and this invention is that the heat engine cycle for the conventional heat pump system is usually a power plant operating at 30–35 percent efficiency. The example of this heat pump invention is limited to a lower heat engine efficiency because of the restraints imposed by the heat of fusion of water as a heat source at 272° K. and cold air as the heat sink at 222° K. The Carnot efficiency at these temperatures for a heat engine would only be 0.18, or about half that of a conventional power plant. This example of the invention, however, would provide an extremely reliable and efficient means for heating in Arctic regions, where much pioneering research is done at high expense, due primarily to basic heating needs. The Carnot efficiency defined as $Q_H/Q_{Amb}'$ is 1.29 for a two-component heat pump absorption system, and the efficiency for this example is 1.17, with 50 percent heat recovery. $Q_H$ is the heat effect of the heat pump, and $Q_{Amb}'$ is the heat input to the heat engine. It would be possible to exceed the two-component efficiency using this invention.

Although certain preferred embodiments of the invention have been herein described in order to illustrate the principles of the invention, it will be understood that various changes and innovations in the illustrated and described embodiments can be effected without departure from the basic principles of the invention. Thus, the refrigeration may operate at a low temperature so that gases may be liquefied. The heat pump may operate at a higher temperature where the heat input could be from a geothermal energy source at relatively low temperature and could produce higher temperature steam that could be used to accelerate many chemical reactions from this higher temperature thermal energy input. All such changes are deemed to be circumscribed by the spirit and scope of the invention, except as the same may necessarily be limited by the appended claims or reasonable equivalents thereof.

What is claimed is:

[1. An absorption system comprising:

a first hydride-dehydride subsystem including first reactor means;

a first hydridable material in said first reactor means for forming a first hydride by reaction with hydrogen gas;

a second hydride-dehydride subsystem including second reactor means;

a second hydridable material in said second reactor means for forming a second hydride by reaction with hydrogen gas;

means for periodically transferring hydrogen gas between said first and second reactor means;

means for supplying heat to said first reactor means and said second reactor means in alternating sequence for effecting chemical compression and dehydriding of the hydrides of said first and second hydridable materials;

means for recovering a part of the thermal energy from said first and second reactor means in each of said subsystems; and means for removing heat from the reactor means in each of said subsystems.]

[2. An absorption system as defined in claim 1 wherein said first hydridable material contained in said first reactor means of said first subsystem is capable of reproducing an equilibrium pressure of hydrogen lower than the equilibrium pressure which can be reproduced by said second hydridable material in said second reactor means of said second subsystem when both hydridable materials are at the same equilibrium temperature.]

[3. An absorption system as defined in claim 2 wherein said first and second reactor means each contains a hydridable material selected from the group consisting of nickel-magnesium alloys, iron-titanium alloys, vanadium metal, vanadium alloys and lanthanum alloys.]

[4. An absorption system as defined in claim 3 wherein said first hydridable material is $LaNi_4Cu$ alloy, and the second hydridable material contained in the second reactor means of said second subsystem is an iron-titanium alloy.]

[5. An absorption system as defined in claim 1 wherein said means for supplying heat to said first and second reactor means comprises:

heat exchanger means;

a feed pump means connected to said heat exchanger means; and a valve-containing conduit system connected between said feed pump means, said heat exchanger means and said first and second reactor means for circulating a heat exchange fluid from said heat exchange means and feed pump means to said reactor means.]

[6. An absorption system as defined in claim 1 wherein said means for removing heat from each of the subsystem reactor means comprises:

a heat exchanger;

a feed pump connected to said heat exchanger; and a conduit system containing valving and connected between said feed pump, heat exchanger and each reactor means of each of said subsystems for circulating a heat exchange fluid between the heat exchanger, feed pump and the reactor means of the respective subsystems.]

[7. An absorption system as defined in claim 1 wherein each of said first and second reactor means comprises a plurality of reactors, each containing a hydridable material;

and wherein said means for partial thermal energy recovery comprises:

a conduit system interconnecting the reactors in each of said first and second reactor means;

pump means associated with each of said conduit systems for circulating a heat exchange fluid through each of said conduit systems between two of the reactors in each of said first and second reactor means at a time when one of said two reactors is undergoing activation of the hydridable material therein, and the other of said two reactors is undergoing deactivation of a hydride of the hydridable material therein.]

[8. An absorption system as defined in claim 1 wherein said means for periodically transferring hydrogen gas between said first and second reactor means comprises a conduit and valving system directly connected between said first and second reactor means.]

[9. A method for deriving refrigeration from a hydrogen absorption system which includes two subsystems each containing a plurality of hydride-dehydride reactors, which method comprises:

combining hydrogen gas with a first hydride-forming material in a reactor of one of said subsystems under conditions of a temperature, $T_1$, and a pressure, $P_1$, such that a first hydride saturated with, and in equilibrium with, hydrogen gas is formed, as the thus combined hydrogen gas is desorbed from a second hydride in a reactor of the second subsystem at a refrigeration temperature, $T_2$, lower than $T_1$, and a pressure, $P_2$, slightly greater than $P_1$, wherein the heat necessary to desorb the second hydride is the refrigeration load;

concurrently heating the first and second hydrides at constant volume by recovering sensible heat from a different reactor in their respective subsystems; then further heating the first hydride at constant volume to a temperature, $T_3$, and a pressure, $P_3$, which are substantially higher than $T_1$, and $P_1$; and further heating the second hydride at constant volume to a temperature, $T_1$, and a pressure slightly lower than $P_3$;

heating the first hydride to desorb hydrogen gas at a temperature, $T_3$, and a pressure, $P_3$;

absorbing the last-mentioned desorbed hydrogen gas in the hydridable material derived from said second hydride;

concurrently cooling the first and second hydrides at constant volume by transferring heat to a reactor in each of the respective subsystems;

further cooling the first hydride at constant volume by a heat exchange fluid;

cooling the second hydride by dehydriding the second hydride by desorption of hydrogen therefrom; and cyclically repeating the foregoing steps.]

[10. A method as defined in claim 9 wherein one system of reactor means contains a first hydridable material capable of producing an equilibrium pressure of hydrogen lower than a second hydridable material of the second system of reactor means with both materials at the same equilibrium temperature.]

[11. A method as defined in claim 10 wherein each system of reactor means contains a hydridable material selected from the group consisting of nickel-magnesium alloys, iron-titanium alloys, vanadium metal and vanadium alloys, and lanthanum alloys.]

[12. A method as defined in claim 11 wherein the said first hydridable material is $LaNi_4Cu$ alloys and the second hydridable material is an iron-titanium alloy.]

[13. A method for deriving a heat pump effect from a hydrogen absorption system comprising:

combining hydrogen gas with a first hydride-forming material under conditions of temperature, $T_1$, and pressure, $P_1$, such that a first hydride saturated with and in equilibrium with hydrogen gas is formed as the hydrogen gas is desorbed from a second hydride at a temperature, $T_2$, substantially lower than $T_1$, and a pressure, $P_2$, slightly greater than $P_1$, wherein the heat of absorption of the first hydride is the heat pump effect;

partial cooling of the first and second hydrides at constant volume by transferring heat to a reactor in each of their respective systems;

further cooling the first hydride by desorption;

cooling the second hydride at constant volume by a heat exchange fluid;

heating the first hydride to desorb hydrogen gas at a temperature, $T_2$, and a pressure, $P_4$, substantially lower than $P_1$, and combining the hydrogen gas in the second hydride-forming material at a temperature, $T_3$, substantially lower than $T_2$, and a pressure, $P_3$, slightly lower than $P_4$;

partially heating the first and second hydrides at constant volume by recovering heat from a reactor in their respective systems;

further heating the first hydride by absorption;

heating the second hydride at constant volume to the temperature, $T_2$, and pressure, $P_2$; and cyclically repeating the foregoing steps.]

[14. A method as defined in claim 13 wherein one system of reactor means contains a first hydridable material capable of producing an equilibrium pressure of hydrogen lower than a second hydridable material of the second system of reactor means with both materials at the same equilibrium temperature.]

[15. A method as defined in claim 14 wherein each system of reactor means contains a hydridable material selected from the group consisting of nickel-magnesium alloys, iron-titanium alloys, vanadium metal and vanadium alloys, and lanthanum alloys.]

[16. A method as defined in claim 15 wherein the said first hydridable material is $LaNi_4Cu$ alloy and the second hydridable material is an iron-titanium alloy.]

[17. A method for deriving refrigeration from a hydrogen absorption system comprising:

establishing a first group of first reaction zones having a first hydridable material in at least one of said first reaction zones, and a hydride formed from said first hydridable material in another of said first reaction zones;

establishing a second group of second reaction zones having a second hydridable material in at least one of said second reaction zones, and a hydride formed from said second hydridable material in at least one other of said second reaction zones, said second hydridable material having a capability of producing an equilibrium pressure of hydrogen higher than the equilibrium pressure of hydrogen produced by said first hydridable material in said first reaction zones when both said first and second hydridable materials are at the same equilibrium temperature;

transferring heat from a refrigeration medium to the one of said second reaction zones containing the hydride of said second hydridable material to desorb hydrogen gas therefrom at a refrigeration temperature $T_2$, and in a pressure $P_2$, wherein the heat necessary to desorb hydrogen gas from the hydride of the second hydridable material is the refrigeration load;

transferring desorbed hydrogen gas from said second reaction zone containing a hydride of said second hydridable material undergoing desorption of the hydrogen gas from the hydride therein by the cooling of said refrigeration medium, to the first hydridable material in said one of said first reaction zones;

combining said transferred hydrogen gas with said first hydridable material in said one of said first reaction zones under conditions of a temperature, $T_1$, and a pressure, $P_1$, which is less than $P_2$, such that a hydride of said first hydridable material in said one first reaction zone which is saturated with, and in equilibrium with, hydrogen gas is formed with concurrent exothermal release of thermal energy; then concurrently increasing the temperature of the desorbed material in said one other of said second reaction zones, and concurrently, increasing the temperature of the hydride material formed in said one first reaction zone by the use of sensible heat supplied from a second of the reaction zones in the respective groups in which said one other of said second reaction zones, and said one of said first reaction zones are located;

further heating the hydride of said first hydridable material at constant volume to a temperature, $T_3$, and a pressure, $P_3$, which temperature, $T_3$, and pressure, $P_3$, are higher than $T_1$ and $P_1$, respectively.

further heating the hydride of the second hydridable material in said one other of said second reaction zones at constant volume to a temperature, $T_1$, and a pressure lower than $P_3$;

terminating the constant volume restriction on the hydride of said first hydridable material in said one reaction zone of said first group and concurrently desorbing hydrogen gas therefrom by continuing to heat the hydride of said first hydridable material in said one reaction zone of said first group at a temperature, $T_3$, and pressure, $P_3$, with concurrent volumetric expansion of the desorbed hydrogen gas;

transferring the desorbed hydrogen gas from said one reaction zone of said first group of reaction zones to the second hydridable material in said one other reaction zone of said second group of reaction zones;

combining said last-mentioned transferred hydrogen gas with said second hydridable material in said other reaction zone of said second group and maintaining an equilibrium pressure lower than $P_3$ by transferring heat to an external heat exchange medium, to increase the temperature in said one other reaction zone of said second group while retaining constant volume in said one other reaction zone; then concurrently decreasing the temperature of the materials in said one reaction zone of said first group, and in said one other reaction zone of said second group by transferring sensible heat therefrom to a different one of the respective first and second reaction zones in the respective first and second groups containing said one reaction zone and said one other reaction zone;

further cooling the material in said one reaction zone of said first group while retaining said one reaction zone at constant volume;

further cooling the material in said one other reaction zone of said second group by desorbing hydrogen gas from the material therein; and cyclically repeating the foregoing steps.]

*18. An absorption system including:*

*hydrogen*

*a first hydride-dehydride subsystem including first reactor means inclusive of a plurality of reactors;*

*a first hydridable material in said first reactor means for forming a first hydride by reaction with said hydrogen gas;*

*a second hydride-dehydride subsystem including second reactor means inclusive of a plurality of reactors;*

*a second hydridable material different from said first hydridable material in said second reactor means for forming a second hydride by reaction with said hydrogen gas;*

*means for periodically transferring said hydrogen gas between said first and second reactor means;*

*means for supplying heat to said first reactor means and said second reactor means in alternating sequence for effecting chemical compression and dehydriding of the hydrides of said first and second hydridable materials;*

*a conduit system interconnecting the reactors in each of said first and second reactor means;*

*pump means associated with each of said conduit systems for circulating a heat exchange fluid through each of said conduit systems between two of the reactors in each of said first and second reactor means at a time when one of said two reactors is undergoing activation of the hydridable material therein, and the other of said two reactors is undergoing deactivation of a hydride of the hydridable material therein.*

*means for removing heat from the reactor means in each of said subsystems.*

*19. An absorption system as defined in claim 18 wherein said means for periodically transferring hydrogen gas between said first and second reactor means comprises a conduit and valving system directly connected between said first and second reactor means.*

*20. An absorption system as defined in claim 18 wherein said means for supplying heat to said first and second reactor means in alternating sequence comprises:*

*heat exchanger means;*

*a feed pump means connected to said heat exchanger means; and*

*a valve-containing conduit system connected between said feed pump means, said heat exchanger means and said first and second reactor means for circulating a heat exchange fluid from said heat exchanger means and feed pump means to said reactor means.*

*21. An absorption system as defined in claim 18 wherein said means for removing heat from reactor means in each of said subsystems comprises:*

*a heat exchanger;*

*a feed pump connected to said heat exchanger; and*

*a conduit system containing valving and connected between said feed pump, heat exchanger and each reactor means of each of said subsystems for circulating a heat exchange fluid between the heat exchanger, feed pump and the reactor means of the respective subsystems.*

*22. An absorption system as defined in claim 18 wherein said first and second reactor means each contains a hydridable material selected from the group consisting of nickel-magnesium alloys, iron-titanium alloys, vanadium metal, vanadium alloy, lanthanum alloys, scandium metal, scandium-cobalt alloys and the alloys of the generic formula $RT_5$ where R is a lanthanide and T is a 3d-transition metal.*

*23. An absorption system as in claim 18 wherein said first hydride-dehydride subsystem and said second hydride-dehydride subsystem each include at least four reactors.*

*24. A method for deriving a heat pump effect from a hydrogen absorption system comprising:*

*(A) combining hydrogen gas with a first hydride-forming material under conditions of temperature, $T_1$, and pressure, $P_1$, such that a first hydride is formed as said hydrogen gas is desorbed from a hydride of a second hydride-forming material, different from said first hydride-forming material, at a temperature, $T_2$, substantially lower than $T_1$, and a pressure, $P_2$, slightly greater than $P_1$, wherein the heat of absorption of the first hydride is the heat pump effect;*

*(B) cooling the resultant hydride of said first hydride-forming material and said second hydride-forming material while minimizing hydrogen transfer therebetween;*

*(C) heating said hydride of said first hydride-forming material to desorb hydrogen gas therefrom at a temperature lower than $T_1$ to thereby provide hydrogen gas for the rehydriding of said second hydride-forming material; and*

*(D) thereafter, bringing the hydride of said second hydride-forming material to the condition of $T_2P_2$ so as to enable repetition of the steps of said method.*

*25. A method as defined in claim 24 wherein hydrogen gas desorbed from said first hydride-forming material is directly combined with said second hydride-forming material at a low, heat sink temperature.*

*26. A method as defined in claim 24 carried out in an apparatus having a plurality of reactors, each containing said first hydride-forming material, and in alternating sequence such that, at any given time, first hydride-forming material in at least one of said reactors is being hydrided.*

*27. A method as defined in claim 24 wherein said first hydridable material and said second hydridable material are selected from the group consisting of nickel-magnesium alloys, iron-titanium alloys, vanadium metal and vanadium alloys, lanthanum alloys, scandium metal, scandium-cobalt alloys and the alloys of the generic formula $RT_5$ where R is a lanthanide and T is a 3d-transition metal.*

*28. A method for deriving refrigeration from a hydrogen absorption system comprising:*

*(a) establishing a first group of first reaction zones having a first hydridable material in at least one of said first reaction zones, and a hydride formed from said first hydridable material in another of said first reaction zones;*

*(b) establishing a second group of second reaction zones having a second hydridable material in at least one of said second reaction zones, and a hydride formed from said second hydridable material in at least one other of said second reaction zones, said second hydridable material having a capability of producing an equilibrium pressure of hydrogen higher than the equilibrium pressure of hydrogen produced by said first hydridable material in said first reaction zones when both said first and second hydridable materials are at the same equilibrium temperature;*

*(c) transferring heat from a refrigeration medium to the one of said second reaction zones containing the hydride of said second hydridable material to desorb hydrogen gas therefrom at a refrigeration temperature and at a pressure $P_2$, wherein the heat necessary to desorb hydrogen gas from the hydride of the second hydridable material is the refrigeration load;*

*(d) transferring desorbed hydrogen gas from said second reaction zone containing a hydride of said second hydridable material undergoing desorption of the hydrogen gas from the hydride therein by the cooling of said refrigeration medium, to the first hydridable material in the said one of said first reaction zones;*

*(e) combining said transferred hydrogen gas with said first hydridable material in said one of said first reaction zones under conditions of a temperature, $T_1$, and a pressure, $P_1$, which is less than $P_2$, such that a hydride of said first hydridable material in said one first reaction zone is formed with concurrent exothermal release of thermal energy; then*

*(f) concurrently increasing the temperature of the desorbed material in said one other of said second reaction zones, and concurrently, increasing the temperature of the hydride material formed in said one first reaction zone by the use of sensible heat supplied from a second of the reaction zones in the respective groups in which said one other of said second reaction zones, and said one of said first reaction zones are located;*

*(g) further heating the hydride of said first hydridable material at constant volume to a temperature, $T_3$, and a pressure, $P_3$, which temperature, $T_3$, and pressure, $P_3$, are higher than $T_1$ and $P_1$, respectively;*

*(h) further heating the material in said one other of said second reaction zones at constant volume to a temperature, $T_1$, and a pressure lower than $P_3$;*

*(i) terminating the constant volume restriction on the hydride of said first hydridable material in said one reaction zone of said first group and concurrently desorbing hydrogen gas therefrom by continuing to heat the hydride of said first hydridable material in said one reaction zone of said first group at a temperature, $T_3$, and pressure, $P_3$, with concurrent volumetric expansion of the desorbed hydrogen gas;*

*(j) transferring the desorbed hydrogen gas from said one reaction zone of said first group of reaction zones to the second hydridable material in said one other reaction zone of said second group of reaction zones;*

*(k) combining said last-mentioned transferred hydrogen gas with said second hydridable material in said other reaction zone of said second group and maintaining a pressure lower than $P_3$ by transferring heat to an external heat exchange medium, to increase the temperature in said one other reaction zone of said second group while retaining constant volume in said one other reaction zone; then*

*(l) concurrently decreasing the temperature of the materials in said one reaction zone of said first group, and*

*in said one other reaction zone of said second group by transferring sensible heat therefrom to a different one of the respective first and second reaction zones in the respective first and second groups containing said one reaction zone and said one other reaction zones;*

*(m) further cooling the material in said one reaction zone of said first group while retaining said one reaction zone at constant volume;*

*(n) further cooling the material in said one other reaction zone of said second group by desorbing hydrogen gas from the material therein; and*

*(o) cyclically repeating steps c through n.*

* * * * *